Patented Jan. 15, 1946

2,392,855

UNITED STATES PATENT OFFICE 2,392,855

HYDROCARBON SOFTENED OLEFINIC POLYMER

Irving E. Lightbown, Roselle, N. J., and Nathan S. Beekley, Jr., Baton Rouge, La., assignors, by mesne assignments, to Jasco, Incorporated, a corporation of Louisiana No Drawing. Application August 15, 1940, Serial No. 352,744

11 Claims. (Cl. 260—36)

This invention relates to synthetic polymers; relates particularly to copolymers or interpolymers of isoolefins, such as isobutylene, with diolefins such as butadiene, dimethylbutadiene, isoprene, pentadiene, and the like; as well as to polyolefins such as polybutadiene; and relates especially to compounding ingredients, such as hydrocarbon oils, for improving the bounce and resiliency of the polymer, while softening the polymer and improving its plasticity during milling, processing and after curing with sulfur.

It has been found that mixtures of an isoolefin, such as isobutylene, with a diolefin, such as butadiene or isoprene or dimethylbutadiene or pentadiene can be polymerized by a low temperature technic at temperatures ranging from —40° C. to —150° C. or lower, into a plastic, elastic interpolymer. This technic utilizes a catalyst which is preferably a solution of aluminum chloride in a low freezing alkyl halide, or carbon disulfide, or similar solvent. The resulting polymer may have a molecular weight ranging from 15,000 to 250,000 or above, and may have an iodine number ranging from 1 or 2 to 40 or 50, and it shows the unexpected and very important property, in spite of its low iodine number, of being reactive with sulfur to yield a "cured" material which has a tensile strength ranging from 2,000 pounds per square inch to 4,500 pounds per square inch, and an elongation ranging from about 900% to 1200%. Thus the material has many of the properties of high grade vulcanized rubber. However, it lacks the capability of bouncing as rubber does, and a cured ball of the polymer which looks and feels much like India rubber, when thrown on the floor shows almost no rebound, but acts much as a water-saturated sponge would do. Also such polymers, either before or after curing, are difficult to handle on the mill, because of this toughness, and in addition, it is highly desirable that for maximum strength, elasticity, flexure resistances and abrasion resistances in the finished material, as little breakdown of molecular weight be allowed to occur on the mill as possible, and for many uses, a greater softness of the curing is desired than is normally characteristic of the cured polymers.

Similarly, other types of synthetic rubber-like polymers such as polybutadiene, known as "Buna," the interpolymers of butadiene and acrylonitrile and similar polymers which are also capable of being vulcanized with sulfur because of their high unsaturation, show difficulties, especially during processing because of stiffness and relatively low plasticity, and undesirably high hardness and lack of pliability.

It is now found that the addition of small amounts of petroleum oils softens the material, both before and after curing and gives to the material the property of bounce or rebound, previously unobtainable in the material; and in addition, greatly improves the milling characteristics before curing. This result is particularly advantageously obtained by the use of relatively heavy oils of low volatility. Furthermore, for a temporary softness in milling, a light, volatile hydrocarbon oil may be used, which is volatilized during the curing, leaving the material in a condition which maintains its original Shore hardness after curing with sulfur.

In a similar manner the diolefinic polymers such as polybutadiene, polychloroprene and the like work much more easily on the mill, bounce more vigorously and are rendered definitely softer by the addition of similar small amounts of hydrocarbons or oils.

Thus the invention consists of a polymer of an isoolefin with a diolefin, or a diolefinic polymer or interpolymer, compounded with a hydrocarbon oil and sulfur, to which may be added a sulfurization aid such as "Tuads" (tetra methyl thiuram disulfide) or a similar organic sulfide, and various fillers and other compounding substances to impart to the material the desirable characteristic of rebound, to improve the physical characteristics of the material during milling, and to soften the polymer, both before and after curing.

Thus an object of the invention is to polymerize a mixture of olefins into an interpolymer having some of the physical characteristics of rubber, and to impart to the product the capability of bounce and rebound, to soften the material, and to improve its physical characteristics during working on the mill by the addition of hydrocarbon oils. Other objects and details of the invention will be apparent from the following description.

In practicing the invention, a desirable polymer is produced from a mixture of olefinic materials prepared at a low temperature. A convenient mixture may contain isobutylene in the proportion of 70 to 99½ parts with a diolefin such as butadiene, isoprene, pentadiene, dimethylbutadiene, and similar conjugated diolefins in the proportion of 30 to ½ parts. This mixture is cooled by the inclusion of from 100 to 600 parts of a diluent-refrigerant, such as liquid ethylene, liquid ethane, liquid methane, or by the inclusion of an excess of solid carbon dioxide as a simple refrigerant and, if desired, the inclusion of an appropriate diluent such as ethyl or methyl chloride, propane, or other low boiling inert hydrocarbon. To this mixture there is then added a polymerization catalyst which is preferably a solution of aluminum chloride in ethyl or methyl chloride, or in carbon disulfide or other suitable inert low freezing solvent. The catalyst is preferably sprayed over the surface of the rapidly stirred olefinic mixture, and the polymerization takes place rapidly to yield the desired high molecular weight copolymer or interpolymer of the iso-olefin and diolefin. For optimum strength and quality in some instances, it is desirable that the polymerization reaction does not go to completion, and accordingly when from 50% to 85% of the reactants have polymerized, that is, after a time interval of from about 3 to 10 minutes, the spray of catalyst is discontinued and the residual catalyst quenched by the addition to the reaction mixture of a substantial quantity of a quenching agent such as an alcohol or ketone or anhydrous ammonia or other basic or oxygenated substance which will combine with the aluminum chloride to destroy its catalytic powers.

The polymer is then brought up to room temperature and washed with water, preferably in a kneading machine to remove the decomposed catalyst. If desired, the reaction mixture may include 0.01 part to 3 or 4 parts of flowers of sulfur, which the polymer occludes during the polymerization reaction. The presence of the sulfur protects and maintains the molecular weight of the polymer during subsequent heating and milling operations. After the polymer has been washed, it is desirably given a drastic milling treatment in a Banbury type mill, to improve its curing characteristics and avoid the development of bubbles, flaws and discontinuities in the body of the cured material.

The washed polymer, either with or without the Banbury treatment, is then desirably compounded with various filling agents. If sulfur has not previously been incorporated into the polymer, from 1% to 4% of sulfur is added to the polymer and milled into the material. To facilitate this milling operation, there is added on the mill a substantial proportion of hydrocarbon substance, which may range from 0.5% to 40% or 50% of the weight of the polymer present, and may consist of a relatively light, volatile hydrocarbon of the approximate nature of naphtha or gasoline, or may consist of a heavy hydrocarbon oil of the general nature of fuel oil or lubricating oil, or may consist of various saturated or unsaturated oils or esters, ethers or other substances. Additional fillers and improving agents such as zinc oxide in the proportion of from 1% to 40% of the amount of the polymer may be added; stearic acid in the proportion of 0.1% to 5 or 10% may likewise be added; carbon black in the proportion of 5% to 200% of the weight of the polymer may likewise be added and various other fillers such as chrome green, lithopone, barytes, etc., may also be added.

*Example 1*

A desirable embodiment of the invention was prepared according to the following formula:

| | Parts |
|---|---|
| Isobutylene-butadiene copolymer | 100 |
| Paracymene | 35 |
| Sulfur | 3 |
| Stearic acid | 5 |
| Zinc oxide | 5 |
| Tuads (tetra methyl thiuram disulfide) | 1 |

The copolymer was placed upon a warm double roll mill, the milling begun and the paracymene added in successive small quantities until the mixture has become conveniently plastic. Simultaneously, or preferably after the addition of the paracymene, the sulfur is added (if it has not been incorporated during the polymerization or Banbury treatment). Thereafter, the stearic acid and zinc oxide are added and thoroughly mixed into the compound by milling. The mill is then cooled and the Tuads added and thoroughly mixed in and the material removed from the mill. The material may then be molded as desired.

The resulting material then shows the following characteristics:

| | |
|---|---|
| Tensile strength__pounds per square inch__ | 2,500 |
| Elongation __per cent__ | 1,200 |
| Shore hardness __degrees__ | 23 |
| Bounce __per cent__ | 55 |
| Softening power | Excellent |

It may be noted that the bounce, in terms of per cent, is the percentage of the height from which it is dropped, to which it rebounds. It may be noted that a good lively rubber compound has a bounce of 60–70% and the bounce of the copolymer containing no hydrocarbon is less than 5%. It may be noted also that the Shore hardness of the compound without the hydrocarbon is 35°.

*Example 2*

A similar compound containing carbon black was prepared with similar advantageous result. The following formula was found to be satisfactory.

| | Parts |
|---|---|
| Isobutylene-butadiene copolymer | 100 |
| Paracymene | 35 |
| Sulfur | 3 |
| Carbon black | 75 |
| Stearic acid | 5 |
| Zinc oxide | 5 |
| Tuads (tetra methyl thiuram disulfide) | 1 |

This compound was prepared in the same manner as the compound in Example 1, and similar improvement in working characteristics on the mill, and in bounce when cured are observed; and in addition, the material is much more resistant to flexure and abrasion.

| | |
|---|---|
| Tensile strength__pounds per square inch__ | 2,200 |
| Elongation | 1,000 |
| Shore hardness __degrees__ | 35 |
| Bounce __per cent__ | 55 |
| Softening power | Excellent |

*Example 3*

A similar compound containing 55° Bé. naphtha was prepared according to the following formula in which the naphtha plays the part of a temporary softener.

| | Parts |
|---|---|
| Isobutylene-butadiene copolymer | 100 |
| 55° naphtha | 25 |
| Sulfur | 3 |
| Stearic acid | 3 |
| Zinc oxide | 5 |
| Tuads | 1 |

This compound was prepared as before, and the presence of the naphtha softens the material and greatly facilitates the milling and the incorporation of the various substances on the mill. The material, after the addition of the Tuads on the cool mill, was placed in the mold and cured. During the curing operation, the naphtha volatilized, but without injury to the polymer, and a high grade cure was obtained free from bubbles, flaws, discontinuities and blemishes of any sort. The resulting cured polymer has substantially the characteristics of polymer cured in the ordinary fashion without plasticizing by the addition of the hydrocarbon substance. A typical material so prepared and cured had the following characteristics:

| | |
|---|---|
| Tensile strength__pounds per square inch__ | 3,800 |
| Elongation _____per cent__ | 1,100 |
| Shore hardness _____degrees__ | 35 |
| Bounce _____per cent__ | 5 |
| Softening power _____ | Excellent |

It may be noted that the curing of all of these compounds is desirably conducted at a temperature of approximately 155° C. (65 pounds steam pressure) for a time ranging from 15 to 60 minutes.

Example 4

A similar compound with gas oil was prepared according to the following formula:

| | Parts |
|---|---|
| Isobutylene-butadiene copolymer _____ | 100 |
| Gas oil (B. range 450° to 700° F.) _____ | 25 |
| Sulfur _____ | 3 |
| Stearic acid _____ | 5 |
| Zinc oxide _____ | 5 |
| Tuads _____ | 1 |

This material was prepared on the mill in the same manner as described in Example 1, and cured in a suitable mold as described in Example 3. The resulting cured compound showed the following characteristics:

| | |
|---|---|
| Tensile strength__pounds per square inch__ | 3,300 |
| Elongation _____per cent__ | 1,200 |
| Shore hardness _____degrees__ | 25 |
| Rebound _____per cent__ | 25 |
| Softening power _____ | Good |

The above composition may be called a "pure gum" stock in view of the relatively small proportion of added ingredients. This stock may, however, be compounded with carbon black in practically any desired proportion, ranging from an amount of carbon black equal to 10% of the polymer to an amount equal to 200% of the polymer or higher, although amounts above about 150% tend to stiffen and toughen the polymer beyond the characteristics desirable for most uses.

Example 5

A lighter, somewhat more volatile hydrocarbon oil may be used than is indicated in Example 4. For this purpose, a medium furnace oil may be used according to the following formula:

| | Parts |
|---|---|
| Isobutylene-butadiene copolymer_____ | 100 |
| Furnace oil (B. range 350° to 450° F.) _____ | 25 |
| Sulfur _____ | 3 |
| Stearic acid_____ | 3 |
| Zinc oxide_____ | 5 |
| Tuads _____ | 1 |

This compound was prepared upon the open mill as above described in Example 1, and was cured as indicated in Example 3. When so cured the characteristics of the product were as follows:

| | |
|---|---|
| Tensile strength_pounds per square inch__ | 3,200 |
| Elongation_____per cent__ | 1,200 |
| Shore hardness_____degrees__ | 25 |
| Rebound_____per cent__ | 45 |
| Softening power_____ | Excellent |

In the above examples, there are indicated a variety of hydrocarbon substances having boiling points ranging from 70° F. to 700° F. Such boiling points are, however, not the limits since somewhat lower boiling and higher boiling substances may be used. Such hydrocarbon oils serve a variety of purposes. First they may act as "temporary softeners" for facilitating the milling operation by making the uncured stock softer and more plastic and allowing more uniform dispersion of fillers, etc., thereby speeding the milling and reducing the loss of molecular weight which occurs during the milling. Secondly, they may not only serve as softening agents during the compounding process, but as permanent softeners or "elasticators" to increase the bounce, rebound and initial "snap" of the cured polymer. Such properties are especially desirable in golf balls, playing balls, motor mounts and similar structural elements where a substantial bounce or snap is required.

The above examples utilize only hydrocarbon materials. The invention is not, however, limited to such substances, but their substituted derivatives which are soluble in the polymers employed, such as chlorobenzene, nitroparaffins, high molecular weight ketones, and ethers, such as dibenzyl ether, and the like may be used. When dibenzyl ether is used in 20% proportion in Example 2 it yields a soft, plastic compound which cures to a blister-free soft sheet with a hardness of 25° Shore.

As above pointed out, the present invention is applicable to other polymer substances than to the interpolymer of isobutylene with a diolefin. It is particularly useful with such synthetic polymers as the polybutadienes known as "Buna," and the interpolymer of butadiene and acrylonitrile known as "Buna-N" as well as the other types of buna polymers, and the various other curable olefinic polymers such as polychloroprene and the like.

Particularly effective results are obtained by the invention in the preparation of mixtures of the various polymers with natural rubber. Because of the relative stiffness of these various polymers, and the fact that they are not susceptible to a partial breakdown and then a repolymerization in a manner which is characteristic of rubber, substantial difficulty has been encountered in the working of the materials on the mill, particularly when it is desired to admix them with rubber, with a minimum breakdown in molecular weight of both substances. For this purpose the admixing of the above mentioned quantities of hydrocarbon oils exerts a softening effect upon the polymers which greatly facilitates the preparation of the mixture with rubber.

Thus the invention consists of a compound of a rubber-like polymer or interpolymer with a hydrocarbon or hydrocarbon derivative incorporated therein, which mixture has the added property of rebound or bounce and in addition the desirable properties of softness and easy working on the mill, and softness as well as bounce or rebound in the cured form.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. A composition of matter comprising an iso-olefin-diolefin interpolymer characterized by a molecular weight within the range of 15,000 to 250,000; an iodine number between 1 and 50; reactivity with sulfur; and when cured with sulfur, a tensile strength within the range of 2,000 to 4,500 lbs. per square inch and an elongation within the range of 900 to 1200%, sulfur and a hydrocarbon oil.

2. A composition of matter comprising an isobutylene-diolefin interpolymer characterized by a molecular weight within the range of 15,000 to 250,000; an iodine number between 1 and 50; reactivity with sulfur; and when cured with sulfur, a tensile strength within the range of 2,000 to 4,500 lbs. per square inch and an elongation within the range of 900 to 1200%, sulfur and a liquid hydrocarbon.

3. A composition of matter comprising an isobutylene-diolefin interpolymer characterized by a molecular weight within the range of 15,000 to 250,000; an iodine number between 1 and 50; reactivity with sulfur; and when cured with sulfur, a tensile strength within the range of 2,000 to 4,500 lbs. per square inch and an elongation within the range of 900 to 1200%, sulfur and a hydrocarbon boiling between 70° F.–700° F.

4. A composition of matter comprising an isobutylene-diolefin interpolymer characterized by a molecular weight within the range of 15,000 to 250,000; an iodine number between 1 and 50; reactivity with sufur; and when cured with sulfur, a tensile strength within the range of 2,000 to 4,500 lbs. per square inch and an elongation within the range of 900 to 1200%, sulfur, a hydrocarbon oil softener, a filler and a vulcanization aid.

5. A composition of matter comprising an iso-olefin-diolefin interpolymer characterized by a molecular weight within the range of 15,000 to 250,000; an iodine number between 1 and 50; reactivity with sulfur; and when cured with sulfur, a tensile strength within the range of 2,000 to 4,500 lbs. per square inch and an elongation within the range of 900 to 1200%, a hydrocarbon oil softener, sulfur, a filler, and a sulfurization aid.

6. A composition of matter comprising an iso-olefin-diolefin interpolymer characterized by a molecular weight within the range of 15,000 to 250,000; an iodine number between 1 and 50; reactivity with sulfur; and when cured with sulfur, a tensile strength within the range of 2,000 to 4,500 lbs. per square inch and an elongation within the range of 900 to 1200%, a hydrocarbonal softener, sulfur, a filler comprising carbon black and a sulfurization aid.

7. In a method of processing a synthetic polymer substance produced by mixing an isoolefin and a diolefin in the proportion of 70 to 99½ parts of isoolefin with 30 to ½ parts of diolefin, cooling to a temperature below −40° C., adding to the mixture a catalyst comprising dissolved aluminum chloride, polymerizing the mixture into a high molecular weight polymer, the steps in combination of adding a hydrocarbon oil substance and curing the polymer and oil mixture with sulfur.

8. In a method of producing a synthetic polymer substance produced by mixing an iso-olefin and a diolefin in the proportion of 70 to 99½ parts of iso-olefin with 30 to ½ parts of diolefin, at a temperature below −40° C., adding to the mixture a catalyst comprising dissolved aluminum chloride, polymerizing the mixture into a high molecular weight polymer, the steps in combination of milling the polymer with a hydrocarbon oil substance, adding sulfur and a sulfurization aid and curing the polymer and oil mixture.

9. In a method of producing a synthetic polymer substance produced by mixing an iso-olefin and a diolefin in the proportion of 70 to 99½ parts of iso-olefin with 30 to ½ parts of diolefin, at a temperature below −40° C. adding to the mixture a catalyst comprising dissolved aluminum chloride, polymerizing the mixture into a high molecular weight polymer, the steps in combination of milling the polymer with a hydrocarbon oil substance and curing the mixture at a temperature ranging between 140° C. and 175° C. for a time interval between 5 and 60 minutes.

10. A composition of matter comprising an isobutylene-diolefin interpolymer characterized by a molecular weight within the range of 15,000 to 250,000; an iodine number between 1 and 50; reactivity with sulfur; and when cured with sulfur, a tensile strength within the range of 2,000 to 4,500 lbs. per square inch and an elongation within the range of 900 to 1200%, sulfur and paracymene.

11. A composition of matter comprising an isobutylene-diolefin interpolymer characterized by a molecular weight within the range of 15,000 to 250,000; an iodine number between 1 and 50; reactivity with sulfur; and when cured with sulfur, a tensile strength within the range of 2,000 to 4,500 lbs. per square inch and an elongation within the range of 900 to 1200%, sulfur and naphtha.

IRVING E. LIGHTBOWN.
NATHAN S. BEEKLEY, Jr.